Feb. 12, 1935.  E. F. NELSON  1,990,877
METHOD OF APPLYING HEAT TO VESSELS USED IN HYDROCARBON OIL CONVERSION
Original Filed Sept. 9, 1929
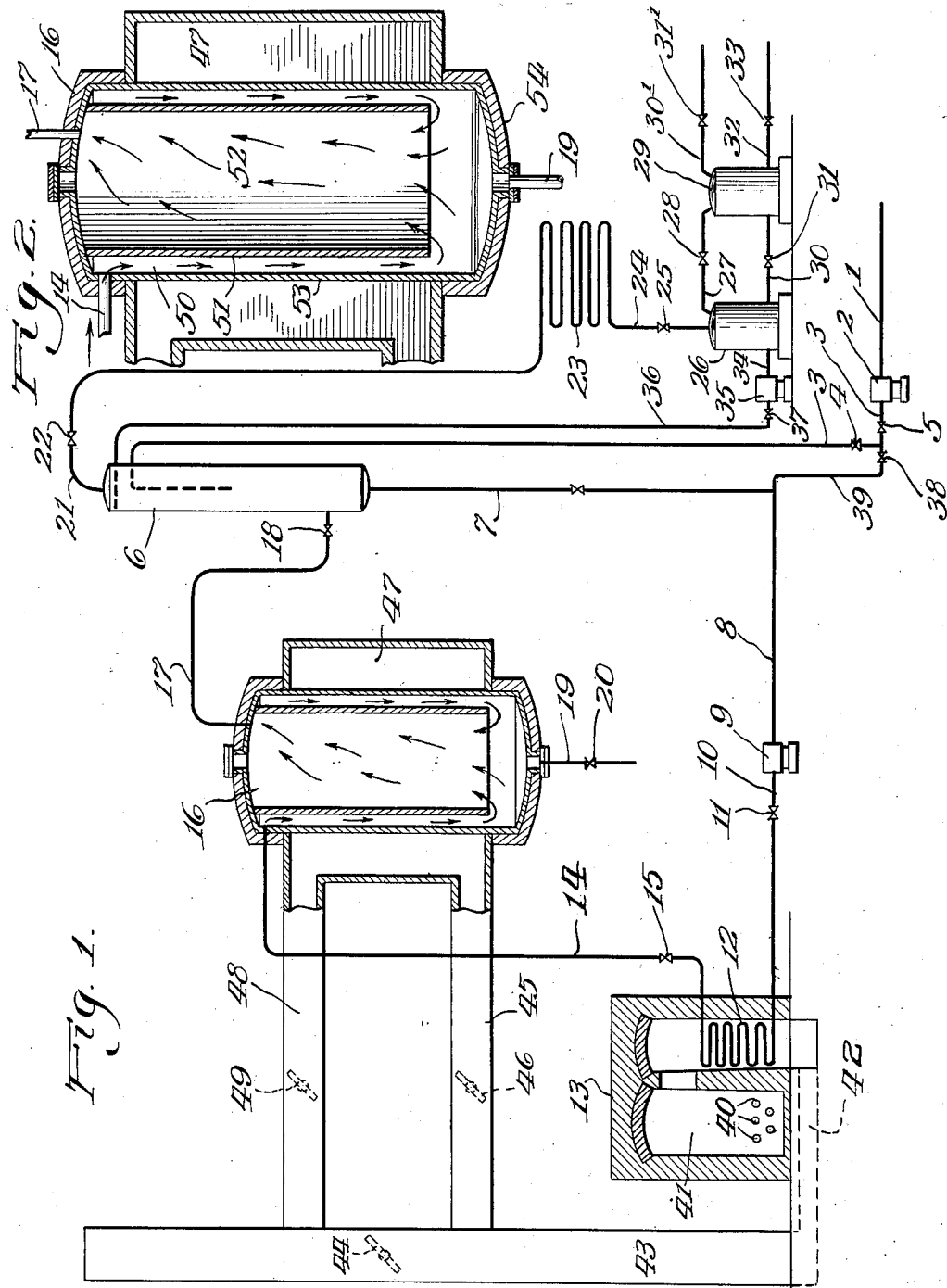

Patented Feb. 12, 1935

1,990,877

UNITED STATES PATENT OFFICE 1,990,877

METHOD OF APPLYING HEAT TO VESSELS USED IN HYDROCARBON OIL CONVERSION

Edwin F. Nelson, Chicago, Ill., assignor to Universal Oil Products Company, Chicago, Ill., a corporation of South Dakota Application September 9, 1929, Serial No. 391,168
Renewed January 26, 1933

4 Claims. (Cl. 196—58)

This invention relates more particularly to an improvement designed especially for processes of the tube and drum type wherein the hydrocarbon oil is heated while traversing a tubular still and then discharged into a reaction chamber wherein separation of vapors from non-vaporous products of reaction take place, and from which the vapors and non-vaporous products are separately withdrawn, the vapors to be further treated and the non-vaporous products generally to be isolated from the system.

In processes of this type, the reaction chamber functions as a time zone wherein the oil and vapors are maintained under pressure and temperature for a time sufficient to bring about the desired reaction, and thus effect the production of maximum yields of lower gravity hydrocarbons.

The present invention relates to an improved method of passing the heated hydrocarbon mass from the tubular still into and through the reaction chamber. The invention, in one specific embodiment, is especially applicable to processes in which the reaction chamber is externally heated.

In processes of the tube and drum type used for the production of lighter hydrocarbons from heavier hydrocarbons, it is the practice under some conditions, to maintain the hydrocarbon oil being treated under reaction conditions for a considerable time sufficient to bring about the desired reaction. This is usually done in an enlarged vessel well insulated or preferably heated externally. In the past, it has been found difficult to heat a vessel of this kind externally, due to the difficulty of passing the heat from the vessel to the oil and vapors within. My invention relates to a novel method of obtaining this heat transfer in large vessels by introducing agitation and turbulence of vapor or oil in contact with the heated walls of the vessel.

The invention briefly is as follows: after the hydrocarbon mass, whether liquid or vapor, or both, has been heated in the tubular still to a temperature desired for cracking under the pressure found most desirable, it is passed into a reaction chamber. In one embodiment of my invention, I provide an annular baffle or partition disposed within the reaction chamber concentric with the wall thereof providing a relatively restricted annular zone or compartment between the outside of said annular partition and the inner wall of the chamber. The heated hydrocarbon mass is preferably initially introduced into the reaction chamber through this confined annular path, which, due to the velocity of the oil and vapors and to the restricted area of the annular zone, causes the oil or vapors to assume a turbulent state, and inasmuch as the oil or vapors are confined adjacent the wall of the vessel, efficient heat transfer takes place between the wall of the vessel and the oil and vapors without objectionable overheating, thus avoiding objectionable production of coke or the like.

In the drawing, Fig. 1 is a diagrammatic side elevational view, partly in section, showing apparatus suitable for carrying out a process for cracking hydrocarbon oils, for which this invention is particularly adapted.

Fig. 2 is an enlarged detail cross-sectional view showing the arrangement of a reaction chamber to obtain the advantages of this invention.

Referring more particularly to the drawing, and in particular to Fig. 1, the charging stock to be processed may be delivered from storage through line 1 and by means of pump 2 forced through line 3, in which may be interposed valves 4 and 5 (valve 38 in branch 39 being closed). The oil from line 3 may pass into dephlegmator 6 where it assists in the condensation and fractionation of the vapors entering the bottom of the dephlegmator. Reflux condensate collecting in the lower part of the dephlegmator, together with unvaporized charging stock, passes out of the bottom thereof through lines 7 and 8 to the suction side of hot oil pump 9, from which it is forced through line 10, controlled by valve 11, through heating coil 12 disposed in a conventional furnace 13. The oil from heating coil 12 leaves through transfer line 14, in which may be interposed valve 15, discharging into reaction chamber 16. The heated hydrocarbon mass entering reaction chamber 16 separates therein into vapors and non-vaporous products, the vapors passing out through vapor outlet line 17, in which may be interposed valve 18, while the non-vaporous products pass to the bottom of the chamber to be withdrawn through residue drawoff line 19, controlled by valve 20, to a cooler (not shown), or if desired, may be further processed. The vapors leaving chamber 16 through line 17 may be passed into the lower portion of dephlegmator 6, wherein sufficiently converted portions are separated from insufficiently converted portions, the latter collecting as reflux condensate to be returned for retreatment together with the raw oil, as heretofore described.

The vapors remaining uncondensed after passing through dephlegmator 6, which comprise those vapors which are sufficiently converted, pass out of the dephlegmator through vapor line 21, controlled by valve 22, into condenser 23. These vapors consist of non-condensable gases and condensable distillate, the condensable distillate being condensed in condenser 23. The mixture of condensed liquid and non-condensable gas leaves the condenser through line 24, in which may be interposed valve 25, passing to receiver 26 where a separation of the gases and distillate occurs. The pressure at which this separation occurs may be controlled by the rate at which gas passes through gas outlet line 27, controlled by valve 28, into a gas separator 29 maintained at lower pressure. The liquid level in receiver 26 may be controlled by the rate of withdrawal of distillate through distillate drawoff line 30, in which may be interposed valve 31, line 30 connecting to the bottom of the gas separator 29. Non-condensable gas from gas separator 29 may pass out through outlet line 30' controlled by valve 31', from which point it may pass to storage or to any other point of utilization.

The distillate in the gas separator 29 may be withdrawn through liquid drawoff line 32, controlled by valve 33 and may be passed to storage. Regulated portions of the distillate collecting in receiver 26 may be withdrawn through distillate recirculating line 34 leading to the suction side of distillate recirculating pump 35, from which point regulated portions of the distillate may be forced through line 36, controlled by valve 37 to the top of dephlegmator 6 to aid in the condensation and fractionation of the vapors leaving the dephlegmator.

It may sometimes be found desirable not to feed all of the charging stock to the top of dephlegmator 6, in which case valve 4 may be partially or totally closed and valve 38 partially or totally opened, permitting the passage of a part or all of the charging stock through branch 39 and line 8 to the suction side of hot oil pump 9.

The oil passing through coil 12 is heated in furnace 13, provided with burner 40, which may utilize oil, gas, coal, coke or other fuel. Combustion gases from burner 40 may pass from combustion chamber 41 through bank 12 which may be heated as found desirable either by radiation, convection or conduction. After passing through heating coil 12, the combustion gases may continue their passage through duct 42 and up through stack 43. The draft on furnace 13 may be controlled by damper 44.

To heat the reaction chamber 16 a portion of the flue gases passing through stack 43 may be by-passed through duct 45, controlled by damper 46, into the lower portion of heating enclosure 47 which surrounds the chamber. The flue gases may leave heating enclosure 47 through duct 48, controlled by damper 49, into stack 43. The relative proportions of flue gases going directly up the stack to the heating enclosure 47 may be controlled by proper manipulation of dampers 44, 46 and 49.

Referring more particularly to Fig. 2, the heated hydrocarbon mass from coil 12 enters reaction chamber 16 through line 14, where it passes through the annular compartment 50. The annular space 50 is made by disposing a circular baffle or partition 51 concentric with the walls of reaction chamber 16, said circular partition 51 preferably extending to within a short distance of the bottom of chamber 16. The mass passing through the annular compartment 50 passes down underneath the base of partition 51, the separated vapors then passing up through the central opening 52, from whence they leave through line 17.

The flue gases being at a higher temperature than the metal wall 53 of reaction chamber 16 heat said wall, which in turn imparts the heat to the oil or vapors passing through annular space 50, which, due to its relatively small cross-section, causes the oil or vapor to be sufficiently turbulent so as not to cause overheating of the film layer next to wall 53. While only one concentric partition is shown, it is to be understood that a series of these partitions may be used to force the oil or vapors up and down through reaction chamber 16 if found desirable.

To prevent heat losses from reaction chamber 16, insulation may be placed on the top and bottom of said chamber, as illustrated in cross-section at 54. It has heretofore been the practice to permit the oil and vapors entering through line 14 to pass unrestricted to either line 17 or line 19, heat being applied to the reaction chamber 16 by the use of heating enclosure 47. According to this invention, I direct the flow of the heated hydrocarbon mass being introduced to the reaction chamber so as to obtain a maximum velocity and considerable turbulence so as to effect sufficient heat transfer from heated wall 53 to the vapors and oil passing through annular space 50. This turbulence breaks up the film next to wall 53 and thus prevents overheating of any portion of the oil and the consequent formation of coke or like undesirable substances.

To illustrate one mode of utilizing my invention, I will describe the operation of a cracking still which includes the present invention.

Referring to Fig. 1, Mid-Continent gas oil having a gravity of approximately 30 degrees A. P. I. may be used as charging stock. This charging stock may be forced by pump 2 to the top of dephlegmator 6, valves 4 and 5 being completely open and valve 38 being closed. This oil may be at a temperature of approximately 80 degrees F., and the throughput may be approximately 800 barrels per day. The material condensing in dephlegmator 6 together with the unvaporized charging stock may be withdrawn through the bottom of the dephlegmator through lines 7 and 8 at a temperature of approximately 750 degrees F., and forced by hot oil pump 9 through heating coil 12 at a rate of approximately 3200 barrels per day. The oil leaving the heating coil 13 through line 14 may be at a temperature of approximately 920 degrees F., discharging into reaction chamber 16, where the liquid may be withdrawn through line 19 by regulating valve 20; in this operation valve 20 may be so regulated as to keep the level of the liquid in reaction chamber 16 just a few inches above the top of the bottom manhead.

Referring now to Fig. 2, the vapor entering reaction chamber 16 through line 14 may pass through the annular compartment 50, thence up the central space 52 and out through line 17, the temperature at this point being about 860 degrees F. The liquid withdrawn through valve 20 may be passed through a cooler (not shown) and thence to storage. Flue gases from furnace 13 may be passed through duct 42 and the lower portion of stack 43, and may then be split by regulation of dampers 44, 46 and 49 so that a portion may pass directly up the stack 43 and the remainder may pass through heating enclosure 47. The temperature of these gases may be approximately 1050 degrees F.

The vapors rising through dephlegmator 6 may pass through line 21, where the temperature may be approximately 500 degrees F., into condenser 23, and thence to receiving tank 26, at a temperature of about 100 degrees F. Valve 28 on line 27 may be so regulated as to keep a pressure of substantially 200 pounds on the condenser, dephlegmator and reaction chamber, friction loss and static head being excepted. The distillate may be withdrawn from receiver tank 26 and passed through line 30 and valve 31 into gas separator 29. Gas may be withdrawn through line 30, valve 31, and the rate of gas withdrawal may be approximately 400,000 cubic feet per day. The distillate may be withdrawn through line 32 and valve 33 to storage. This distillate will have a gravity of approximately 53 degrees A. P. I., and will contain approximately 75% gasoline meeting U. S. Motor fuel specifications. The quantity of distillate produced will be about 480 barrels per day.

A portion of the distillate in receiver tank 26 may be forced by pump 35 at a rate of about 100 barrels per day, through valve 37 and line 36 to the top of dephlegmator 6, to accomplish cooling and fractionation and to aid in the control of the temperature of the vapors leaving the dephlegmator 6 through line 21.

In Fig. 1, I have shown valves 15, 18, 22, 25, 28 and 31 any or all of which may be used for maintaining various pressures on different portions of the system. These valves may be utilized to advantage where it may be desired to procure certain types of charging stocks, or where it may be desired to obtain certain qualities of products, and to maintain such pressures on the various portions of the system to more efficiently produce the results desired. For example, in some cases it may be found that lower pressures may be maintained beyond valve 18 in the system, in which case dephlegmator 6 may be built for lower pressures and therefore of lighter construction than when higher pressures are used, thus effecting economies in the construction of the equipment.

The cracking system that I have described consists essentially of five parts: the heating coil 12 used to bring the oil up to the temperatures necessary for cracking; reaction chamber 16 used to keep the oil or vapor at a reaction temperature for a period of time; dephlegmator 6 wherein a separation is made of sufficiently and insufficiently converted hydrocarbons and from which the heavier portions may be returned to the heating coil and the lighter portions pass through the condenser; condenser 23, where a condensation takes place of all the sufficiently converted material but the non-condensable gases; and vessels for the separation of the condensate and the non-condensable gases. My invention refers particularly to the method of heating the contents of the reaction chamber in a cracking system such as just described. While I have shown this cracking system and the carrying out of the various steps of my process in connection therewith, it should be understood that my invention is applicable to any cracking system wherein it is desirable to supply heat to the oil or vapors being subjected to time and temperature conditions in a vessel.

My invention as will be readily recognized by those skilled in the art, comprises a novel method of passing oil or vapors through a vessel where they are being subjected to treatment, and where heat is being applied externally to this vessel, both for the purpose of adding heat to the reaction and for eliminating heat losses.

I claim as my invention:

1. A hydrocarbon oil cracking process which comprises passing the oil in a restricted stream through a heating zone and heating the same therein to cracking temperature under pressure, discharging the heated oil into an enlarged vertical reaction zone of substantially uniform cross-section, initially passing said heated oil downwardly in a confined turbulent annular stream of relatively small cross-section along the inner vertical wall of the reaction zone, maintaining said annular stream at cracking temperature by circulating heating gases around the outer vertical wall of said reaction zone, permitting said heated oil to occupy the full cross-sectional area of said reaction zone at the lower portion thereof whereby the vapor separation is facilitated, separating said heated oil into vapors and residuum in the lower portion of said reaction zone, passing the separated vapors upwardly through the central portion of said reaction zone in a stream of greater cross-section than said annular stream, removing the vapors from the upper portion of said reaction zone and subjecting the same to dephlegmation and condensation.

2. A hydrocarbon oil cracking process which comprises passing the oil in a restricted stream through a heating zone and heating the same therein to cracking temperature under pressure, by heat exchange with hot combustion gases, discharging the heated oil into an enlarged vertical reaction zone of substantially uniform cross-section, initially passing said heated oil downwardly in a confined turbulent annular stream of relatively small cross-section along the inner vertical wall of the reaction zone, maintaining said annular stream at cracking temperature by circulating a regulated portion of said combustion gases around the outer vertical wall of said reaction zone, permitting said heated oil to occupy the full cross-sectional area of said reaction zone at the lower portion thereof whereby the vapor separation is facilitated, separating said heated oil into vapors and residuum in the lower portion of said reaction zone, passing the separated vapors upwardly through the central portion of said reaction zone in a stream of greater cross-section than said annular stream, removing the vapors from the upper portion of said reaction zone, and subjecting the same to dephlegmation and condensation.

3. A hydrocarbon oil cracking process which comprises passing the oil in a restricted stream through a heating zone and heating the same therein to cracking temperature under pressure, discharging the heated oil into an enlarged vertical reaction zone of substantially uniform cross-section, initially passing said heated oil downwardly in a confined turbulent annular stream of relatively small cross-section along the inner vertical wall of the reaction zone, separating vapors from unvaporized oil in the lower portion of the reaction zone and withdrawing the unvaporized oil from the lower portion of the reaction zone, passing the separated vapors upwardly through the central interior portion of the reaction zone out of contact with said annular stream, and then removing said separated vapors from the upper portion of the reaction zone for dephlegmation and condensation.

4. A hydrocarbon oil cracking process which comprises passing the oil in a restricted stream through a heating zone and heating the same therein to cracking temperature under pressure, discharging the heated oil into an enlarged vertical reaction zone of substantially uniform cross-section, initially passing said heated oil downwardly in a confined turbulent annular stream of relatively small cross-section along the inner vertical wall of the reaction zone, maintaining said annular stream at cracking temperature by circulating heating gases around the outer vertical wall of said reaction zone, separating vapors from unvaporized oil in the lower portion of the reaction zone and withdrawing the unvaporized oil from the lower portion of the reaction zone, passing the separated vapors upwardly through the central interior portion of the reaction zone out of contact with said annular stream, and then removing said separated vapors from the upper portion of the reaction zone for dephlegmation and condensation.

EDWIN F. NELSON.